United States Patent
Pfeiffer

(10) Patent No.: US 12,189,231 B2
(45) Date of Patent: Jan. 7, 2025

(54) LIQUID CRYSTAL DISPLAYS WITH POLARIZED INFRARED ILLUMINATION

(71) Applicant: New Vision Display, Inc., Roseville, CA (US)

(72) Inventor: Matthias T. Pfeiffer, Boulder, CO (US)

(73) Assignee: New Vision Display, Inc., Roseville, CA (US)

( * ) Notice: Subject to any disclaimer, the term of this patent is extended or adjusted under 35 U.S.C. 154(b) by 0 days.

(21) Appl. No.: 18/236,733

(22) Filed: Aug. 22, 2023

(65) Prior Publication Data

US 2023/0393430 A1 Dec. 7, 2023

Related U.S. Application Data

(63) Continuation of application No. 17/396,473, filed on Aug. 6, 2021, now Pat. No. 11,768,398.

(51) Int. Cl.
| | |
|---|---|
| G02F 1/1335 | (2006.01) |
| B60Q 1/50 | (2006.01) |
| B60R 13/10 | (2006.01) |
| F21V 8/00 | (2006.01) |
| G02F 1/133 | (2006.01) |

(52) U.S. Cl.
CPC ....... *G02F 1/133536* (2013.01); *B60Q 1/503* (2013.01); *B60R 13/105* (2013.01); *G02B 6/0055* (2013.01); *G02B 6/0056* (2013.01); *G02F 1/13306* (2013.01); *G02F 1/133512* (2013.01); *G02F 1/133616* (2021.01); *G02F 2203/02* (2013.01); *G02F 2203/11* (2013.01)

(58) Field of Classification Search
None
See application file for complete search history.

(56) References Cited

U.S. PATENT DOCUMENTS

2014/0022492 A1\* 1/2014 Lee .................. G02F 1/133528
349/97

FOREIGN PATENT DOCUMENTS

CN 111107201 A \* 5/2020 ............ H04M 1/026

\* cited by examiner

*Primary Examiner* — Shan Liu
(74) *Attorney, Agent, or Firm* — Weintraub Tobin; Jo Carothers

(57) ABSTRACT

Systems and methods for IR readable transmissive and reflective displays are disclosed that do not suffer from a mirror-like appearance or undesirable dimming of the display due to sequential stacks of polarizers. The disclosed systems and methods use available IR LEDs in addition to, or in place of, visible light LEDs. An illuminator or integrator, which is a lightguide, is designed to maintain the polarization state of the light. The display can use a regular visible light, front polarizer and hence does not suffer from brightness reduction caused by an IR capable polarizer. A digital license plate application comprising a reflective liquid crystal display with a front light, which includes polarized IR illumination, is also disclosed.

6 Claims, 13 Drawing Sheets

LIQUID CRYSTAL DISPLAYS WITH POLARIZED INFRARED ILLUMINATION

CROSS-REFERENCE TO RELATED APPLICATION

This application is a continuation of and claims the benefit of priority from U.S. patent application Ser. No. 17/396,473 entitled "Liquid Crystal Displays with Polarized Infrared Illumination" filed on Aug. 6, 2021, which is fully incorporated herein by reference.

FIELD OF THE INVENTION

The present disclosure relates to infrared readable liquid crystal displays, and more specifically, to illuminating liquid crystal displays with polarized infrared light to extend readability beyond the usable contrast range of the liquid crystal display polarizers to longer wavelengths.

BACKGROUND OF THE INVENTION

Modern liquid crystal displays (LCDs) can comprise millions of individual pixels, which in an LCD is a thin multilayered structure of many components. Pixels in an LCD are illuminated using an unpolarized light source, such as light emitting diodes (LEDs).

Most LCD pixels are based on two functional principles: 1) an electrically controllable liquid crystal layer between transparent substrates changes the polarization state of the light passing through it based on applied electrical signals and 2) one or more polarizers and optional additional optical films transform a difference of polarization states into visible bright and dark contrast regions. Together the polarizer(s) and the liquid crystal layer form an electrically controllable light valve, which lets a portion of the light pass through depending on the electrical stimulus.

Since most LCDs are flat or slightly curved and may have a substantial size, generally film polarizers are required. Such films are adhered to one or more surfaces of the display and cover substantially the entire image area. Film polarizers typically comprise two layers of a transparent isotropic polymer such as cellulose Tri-Acetate (TAC), sandwiching a stretched Poly Vinyl-Alcohol (PVA) layer containing anisotropic chromophores, which align due to the stretching of the PVA and provide the polarization effect.

The chromophores are typically iodine, which is present in the PVA as $I_3$- and $I_5$-PVA complexes. Alternatively, the PVA layer may be impregnated with different anisotropic dye molecules that together cover the visible range of the spectrum. Common to either the iodine method or the dye method is that the range of usable contrast is limited to the visible range of the spectrum as the PVA-iodine complexes and the typically used anisotropic dyes are transparent in the near infrared. Hence, when viewing normal LCD's with IR sensitive cameras or night vision equipment, they do not show an image when operated under non-visible IR-illumination only.

It is sometimes desirable or even necessary that LCDs can be viewed using invisible infrared light. For example, it may be necessary to read an LCD with night vision goggles in the absence of any visible light, or it may be necessary to read LCDs with infrared cameras.

Common to most outdoor optical equipment is that it selectively uses vertically polarized light to eliminate glare from glancing reflections of smooth or wet surfaces. This is achieved by adding polarization elements to the front of the camera lenses. Such polarizing elements can be selected so that they can reject visible and/or IR light with an undesired polarization state.

While it is possible to add additional types of dye molecules that are absorbing at longer infrared wavelengths to the chromophore layer of a polarizer to extend the polarizer's usable contrast range, this is undesirable as such polarizers necessarily have a lower transmission in the visible range, leading to darker displays. This is because adding more dye molecules reduces transmission, and most dyes have higher order absorption bands. For example, a dye that would absorb at 900 nm in the infrared range would likely also absorb at around 450 nm, which is in the visible range. A higher absorption (or lower transmission) is a problem especially for reflective displays or battery-operated displays where the lower visible transmission cannot be compensated for with a stronger light source.

Alternate types of polarizers such as wire grid polarizers, cholesteric film polarizers, and multilayer birefringent stack polarizers function on the principle of transmitting one polarization state while reflecting the other. These types of polarizers are an option for the rear side of a display, if backed by a suitable absorber for the transmitted polarization. Such polarizers typically have good contrast in the near infrared as they are not based on absorption of dyes. For example, a common 3M DBEF polarizer or a Nagase WGF works well to 850 nm. Such devices can be used instead of absorptive rear polarizers in an LCD. For example, an IR wire grid polarizer can be placed behind a display as the rear polarizer. However, it is undesirable to use such polarizers on the front of a display as they have a metallic, mirrorlike appearance due to the specular reflection of about half the incoming light. If they are used in front of the display, they will have to be hidden under an additional absorptive polarizer that will remove the reflected portion of the light in the visible range, while taking appropriate steps that such specular reflection of infrared light will not interfere with reading the display with infrared equipment.

Thus, it would be desirable to extend the usable contrast range of LCDs to longer wavelength, and to make them readable by infrared equipment without the side-effects of lower brightness in the visible range, mirrorlike appearance, or the need of additional polarizers that prevent the mirrorlike appearance.

BRIEF SUMMARY OF THE INVENTION

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

Many liquid crystal displays have an integrated light source, either as a backlight or a front light. The front light or backlight typically is composed of the actual light source and an 'integrator', which distributes the light evenly across the display. The light sources are typically CCFL tubes, electroluminescent films, or, most suitably, light emitting diodes, such as either solid state LEDs or organic LEDs. An integrator may be a light cavity or a transparent lightguide that distributes the light evenly across the display surface.

Since LEDs are available, which emit light in the required range of infrared wavelength, such LEDs can replace or be added to visible light LEDs to create an infrared illuminator. This invention and disclosure comprise such an illuminator or integrator, which is a lightguide that is designed to maintain the polarization state of the light. The display can use a regular, visible-light, front polarizer and hence does not suffer from a brightness reduction caused by an IR-capable polarizer.

A polarizer in front of an LCD display serves two functions: 1) it polarizes incoming light and 2) it analyzes, or turns into contrast, the polarization state of the light coming out of the display. If the observer uses polarized light, for example with polarized sunglasses or, more suitably, an optical device, such as a camera or night vision equipment, the second function is already provided by this equipment. Hence, to extend the usable wavelength range of an LCD display into the IR range, either both functions need to be extended into the IR range, or if it can be assured that any relevant IR equipment has its own polarizer, it is sufficient to only extend polarizing the incoming light into the IR range.

Visible range polarizers are isotropic and transparent in the infrared range used by night vision equipment or infrared cameras, specifically in the range of 700 to 1100 nm. Hence, if a display is illuminated with polarized IR light it will remain readable to IR detection equipment that uses an IR-polarizer for glare reduction.

If a display has an infrared-capable, rear polarizer, illuminating it with a polarized IR source will create contrast even without a polarizer on the optical equipment as light will be reflected out through the display, depending on the polarization state after the first path through the display.

One exemplary embodiment of this invention and disclosure is an infrared transmissive LCD display with a backlight comprising a lightguide and LED edge illumination. In addition to visible-light LEDs, IR-emitting LEDs are added to the edge of the lightguide. An infrared polarizer, such as a wire grid polarizer, is placed between the infrared and optionally the visible LEDs and the lightguide edge to provide a suitable polarization state. The light guide is designed to maintain that polarization.

In visible light operation polarized or unpolarized visible light is guided through the lightguide into the display and passes through the display from the back to the front. When exiting the lightguide, the light first encounters a polarizer that polarizes it into the desired state. It then passes through the liquid crystal layer, which can change the polarization of the light depending on the desired state of a pixel. Finally, it passes through the front polarizer, which acts as the analyzer and thus creates a brightness contrast, visible to the naked eye.

In infrared operation, the IR LEDs emit light that is polarized when passing through the IR polarizer. The polarized IR light passes through the lightguide and is directed towards the LCD. The polarizer in the LCD appears transparent to the IR light. The liquid crystal layer changes the polarization state if needed, based on the state of the pixel. The front polarizer appears transparent to the IR light and hence does not act as an analyzer.

As a result, some areas of the display emit light in one polarization state whereas other areas emit light in another polarization state. Infrared sensitive optical equipment such as infrared cameras or night vision goggles with an IR antiglare polarizer can detect the image as their polarizer acts as the analyzer, turning the polarization differences into a brightness contrast for the sensor element. Human eyes cannot detect differences in the polarization state of the light, but they can detect differences in brightness. The function of the analyzer is to turn differences in polarization states into differences in brightness by letting through one polarization state while absorbing or reflecting the other. This embodiment may also include further optical films, such as retardation films, compensation films, or other light management films that optimize the performance of the device.

Another exemplary embodiment of this invention and disclosure is a reflective LCD display with polarized IR illumination. In visible light operation, ambient light or light from visible light LEDs in the front light travels through a front light that leaves it unchanged, and then to the front polarizer where the light is polarized. In an alternate embodiment, the ambient visible light first encounters a visible light (absorptive) polarizer that imparts a specific polarization state, which remains unchanged when traveling through the front light guide. The polarized light then enters the liquid crystal layer where its polarization state may be changed depending on the electrical signals applied. It may then pass through an optional polarizer before being reflected by a mirror, or it may be reflected by a polarizing mirror such as a reflective polarizer, backed with an absorber.

On the return path, the light again passes through the liquid crystal layer and through the front polarizer, which acts as the analyzer, turning differences in polarization state into a brightness contrast. Finally, the light passes through the front light, which appears mostly transparent to the light. In an alternate embodiment, the light first encounters the front light guide where its polarization state remains unchanged, before being analyzed in the front polarizer.

In IR light operation, IR light from the IR LEDs is coupled into the front light lightguide via an IR polarizer. The polarized IR light passes through the lightguide, which may be positioned in front of the front polarizer or between the front polarizer and the LCD without change in polarization state. The lightguide sends the light through the LCD, where the polarization state of the light can be changed according to the signals applied. The light is selectively reflected at only one polarization by a reflective polarizer or polarizer-mirror combination behind the display, while the other polarization is absorbed.

The reflected light returns through the liquid crystal layer, where further polarization adjustment may happen. Upon exiting the LCD layer, the light encounters the front polarizer and front light, which both appear transparent to the IR light. As a result, some areas of the display appear to emit IR light, while others do not. Infrared sensitive optical equipment will detect different brightness levels depending on the liquid crystal state even without an IR antiglare polarizing element. This embodiment may also include further optical films such as retardation films, compensation films, diffuser films and other light management films that optimize the performance of the device.

Another exemplary embodiment of this invention and disclosure is a reflective liquid crystal display for a digital license plate application comprising a reflective liquid crystal display with a front light, which includes polarized IR illumination. License plate recognition systems operate at specific infrared wavelengths, such as 750 nm, 850 nm, 870 nm and others. The reflective LCD may be a bi-stable or multi-stable LCD due to the low power requirements of such displays compared to displays requiring constant updating. One such bistable LCD type may be a Memory-in-Pixel LCD, another may be a bistable nematic LCD known as 'Binem' or a bistable nematic display known as 'ZBD'.

The LCD may work on a single polarizer basis or have a reflective rear polarizer, such as a multilayer polymer stack available from 3M™ known as DBEF, a wire grid polarizer such as a Nagase WGF, or similar, which have usable contrast from about 380 nm to greater than 850 nm. The front lightguide may be located in front of or behind the front polarizer. The front lightguide is illuminated from the edge with optional white light LEDs for night visibility and with a plurality of IR LEDs selected for a desired wavelength or multiple desired wavelengths depending on the requirements of the location where such a license plate is issued. For example, a display may be fitted with several 750 nm and several 850 nm LEDs if that matches the requirement. Other combinations are possible as well.

A narrow polarizer strip of a polarizer with good polarization efficiency at the desired wavelengths is placed between the IR LEDs and the lightguide. Such polarizer may be a dye type polarizer with dye selected for infrared operation only and it may not have good transmission or polarization efficiency in the visible spectrum as no visible light is required to pass through it. Another suitable type of polarizer may be a wire grid type polarizer or multi-layer stack polarizer as such polarizers are simpler and easier to produce at a lower cost than wire grip polarizers for the visible range.

A polarization preserving lightguide may be made from transparent polymers, glass, or a combination of different transparent materials and may be coated with materials with different refractive indices. The light travels from the light source through the lightguide due to total internal reflection. Additional features such as certain shapes of alternating materials or certain surface structures, such as dimples or prisms, cause the light to be sent towards the display, but not to the opposite surface.

The light passes through the liquid crystal layer where its polarization may get changed according to the liquid crystal alignment before encountering a selective reflection in the rear reflective polarizer. In dark areas the light has a polarization state that passes through the reflective polarizer and gets absorbed in a black layer placed behind the display assembly. In bright areas, the light gets reflected back through the display, where further polarization changes may happen. The front polarizer appears transparent to infrared light.

These structures in the front light are designed to allow at least a portion of the light being reflected by the display to pass through to the front surface. A license plate recognition system with an optional anti-glare IR polarizer on the lens operating on any of the wavelengths that is provided by the IR LEDs will now see different regions of the display as bright or dark, depending on the local polarization state of the light.

Accordingly, one or more embodiments of the present invention overcomes one or more of the shortcomings of the known prior art.

For example, in one embodiment, an infrared light readable liquid crystal display system comprises a liquid crystal display comprising a liquid crystal display cell comprising: a liquid crystal layer to control the polarization state of visible light and infrared light, a front substrate, a rear substrate, and wherein the liquid crystal layer is located between the front substrate and the rear substrate; a visible light front polarizer, wherein the visible light front polarizer is transparent to infrared light; and a reflective rear polarizer to polarize visible light and infrared light; and an illumination unit comprising a plurality of light sources, wherein at least one of the plurality of light sources emits infrared light.

In this embodiment, the infrared light readable liquid crystal display system can further comprise: wherein the liquid crystal display is an infrared transmissive liquid crystal display, and wherein the illumination unit is a backlight; wherein the backlight further comprises an absorber to absorb extra light; wherein the infrared transmissive liquid crystal display further comprises a visibly opaque layer transparent to infrared light and the backlight further comprises a reflector, wherein the reflector reflects infrared light; wherein the backlight further comprises a polarization conserving lightguide, and an infrared polarizer, wherein the infrared polarizer is located between the plurality of light sources and the polarization conserving lightguide; wherein the visibly opaque layer is transparent to infrared light, and wherein the visibly opaque layer appears black in visible light; wherein the visibly opaque layer is transparent to infrared light, and wherein the visibly opaque layer is non-black in visible light; wherein the plurality of light sources comprises at least one infrared emitting light source and at least one visible light emitting light source; wherein the liquid crystal display is a reflective liquid crystal display, and wherein the illumination unit is a front light; wherein the front light is located between the visible light front polarizer and the liquid crystal display cell; wherein the front light is in front of the visible light front polarizer from the perspective of an observer; wherein the front light further comprises a polarization conserving lightguide and an infrared capable polarizer, and wherein the infrared capable polarizer is located between the illumination unit and the polarization conserving lightguide; wherein the plurality of light sources comprises at least one infrared emitting light source and at least one visible light emitting light source.

In another example embodiment, an infrared light readable liquid crystal display system for an electronic license plate comprises a liquid crystal display comprising a liquid crystal display cell comprising a liquid crystal layer to control the polarization state of visible light and infrared light, a front substrate, a rear substrate, and wherein the liquid crystal layer is located between the front substrate and the rear substrate; a visible light front polarizer, wherein the visible light front polarizer is transparent to infrared light and a reflective rear polarizer to polarize visible light and infrared light; an illumination unit comprising a plurality of light sources wherein at least one of the plurality of light sources emits infrared light; a plurality of light sensors wherein at least one of the plurality of light sensors is sensitive to infrared light; and an electronic circuit capable of driving the at least one of the plurality of light sources that emits infrared light.

In this embodiment, the infrared light readable liquid crystal display system for an electronic license plate further comprising a microcontroller to receive an input from the at least one of the plurality of light sensors sensitive to infrared light, and wherein based on the input the microcontroller controls the at least one of the plurality of light sources that emits infrared light; further comprising a separate circuit to receive an input from the at least one of the plurality of light sensors sensitive to infrared light, and wherein based on the input the separate circuit controls the at least one of the plurality of light sources that emits infrared light; wherein the plurality of light sources comprises at least one infrared emitting light source and at least one visible light emitting light source; and wherein the liquid crystal display maintains a stable visible image without being refreshed more than once per second.

In another example embodiment, a method of operating an infrared light readable liquid crystal display system comprises providing a liquid crystal display comprising a liquid crystal display cell comprising a liquid crystal layer to control the polarization state of visible light and infrared light, a front substrate, a rear substrate, and wherein the liquid crystal layer is located between the front substrate and the rear substrate; a visible light front polarizer, wherein the visible light front polarizer is transparent to infrared light, and a reflective rear polarizer to polarize visible light and infrared light; providing an illumination unit comprising a plurality of light sources, wherein at least one of the plurality of light sources emits infrared light; and controlling the plurality of light sources based on an external stimulus.

In another example embodiment, a method of operating an infrared light readable liquid crystal display system for an electronic license plate comprises providing a liquid crystal display comprising a liquid crystal display cell comprising a liquid crystal layer to control the polarization state of visible light and infrared light, a front substrate, a rear substrate, and wherein the liquid crystal layer is located between the front substrate and the rear substrate; a visible light front polarizer, wherein the visible light front polarizer is transparent to infrared light; and a reflective rear polarizer to polarize visible light and infrared light; providing an illumination unit comprising a plurality of light sources, wherein at least one of the plurality of light sources emits infrared light; providing a plurality of light sensors wherein at least one of the plurality of light sensors is sensitive to infrared light; providing an electronic circuit capable of driving the at least one light source which emits infrared light; and controlling the plurality of light sources with the electronic circuit based on illumination conditions from the plurality of light sensors.

Other objects, features, and advantages of the present invention will become apparent upon consideration of the following detailed description and the accompanying drawings.

DETAILED DESCRIPTION OF THE INVENTION

The following is a detailed description of embodiments to illustrate the principles of the invention. The embodiments are provided to illustrate aspects of the invention, but the invention is not limited to any embodiment. The scope of the invention encompasses numerous alternatives, modifications, and equivalents. The scope of the invention is limited only by the claims.

While numerous specific details are set forth in the following description to provide a thorough understanding of the invention, the invention may be practiced according to the claims without some or all of these specific details.

Various embodiments will be described in detail with reference to the accompanying drawings. Wherever possible, the same reference numbers are used throughout the drawings to refer to the same or like parts. References made to particular examples and implementations are for illustrative purposes and are not intended to limit the scope of the claims.

BACKGROUND AND PRIOR ART

Figure 1:
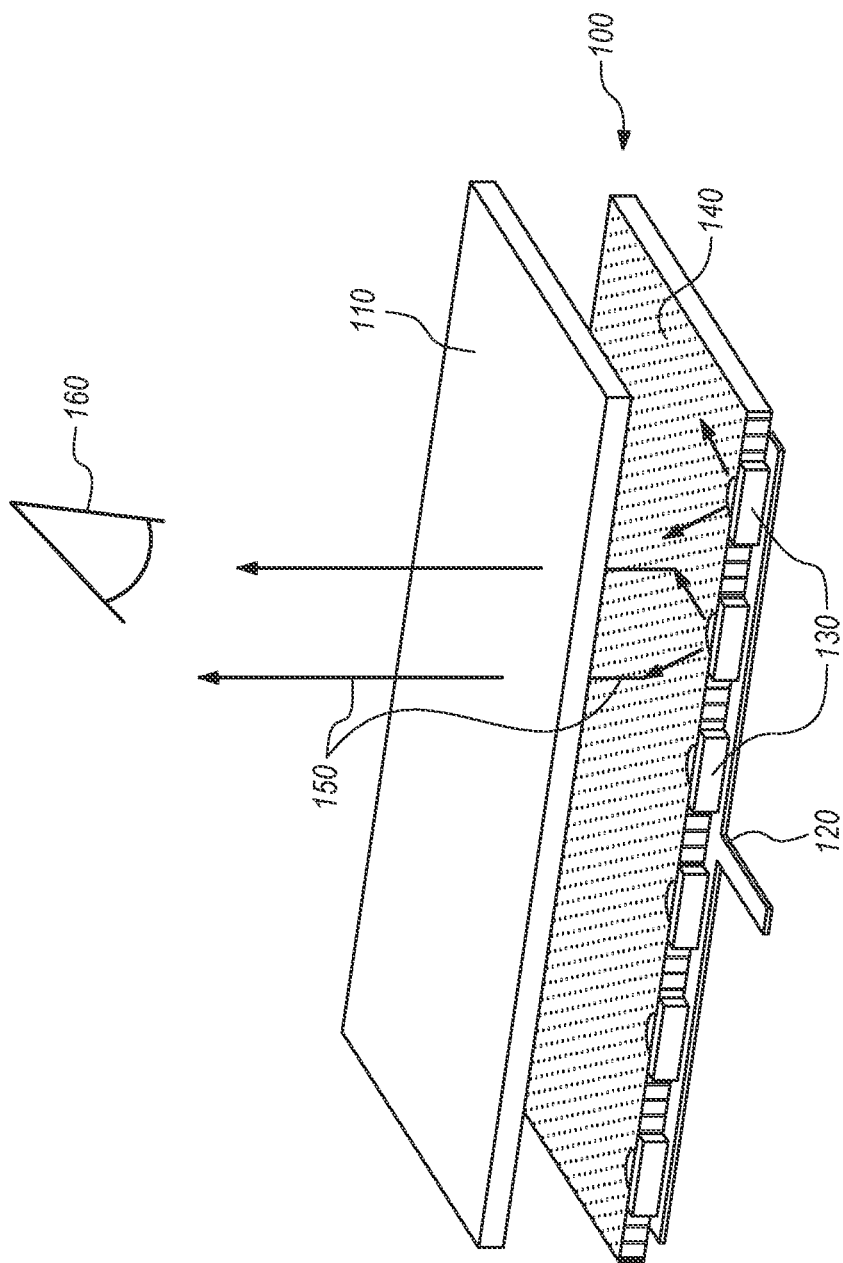
FIG. 1 shows a typical prior art backlight as used with transmissive or transflective displays.

FIG. 1 shows a typical prior art backlight 100 as used with transmissive or transflective display 110. The backlight 100 is placed behind the display 110 from a viewer's perspective. Although, other backlight designs and principles exist, here the description shall be given using the example of an edge-lit lightguide-based backlight. The backlight 100 comprises a lightguide 140, which is typically made from a transparent polymer such as PMMA, PC or glass.

Lightguide 140 is similar in size with respect to length and width dimensions to display 110 and serves the purpose of spreading the light uniformly across the display 110. The lightguide 140 has features that may be in the bulk or on the surface. Such features in the surface may be dimples or prisms, in the bulk they may be randomly or regularly distributed alternate materials. The features are designed as to cause the light 150 to leave the lightguide 140 in a defined direction and with a uniform intensity distribution as shown in FIG. 1.

The features may send the light 150 directly to display 110 or first to a reflector behind the lightguide 140 from observer's 160 perspective, from where the light 150 is reflected towards the display 110. Lightguide 140 may incorporate other optical functions, such as diffusion or light shaping and directing, or these functions may be added in separate components (usually sheets of films) placed into the immediate vicinity of the lightguide 140 or adhered to it.

Illuminators 130 are placed along one or more edges of the lightguide 140. In one embodiment, illuminators 130 can be side firing LEDs. It is important that the light 150 is effectively coupled into the lightguide 140 without excessive waste. This is achieved by the design of the interface between illuminator 130 and lightguide 140 as well as the design of the light sources such that the emitted light 150 exits the light source in a useful range of angles. Typically, a flexible printed circuit 120 provides the electrical current to operate the illuminators, which may be arranged electrically in series, parallel, or in parallel groups of smaller series.

In one embodiment, the LEDs comprising the illuminators 130 may be selected to emit white, red, green, blue, or infrared (IR) light or any combination thereof. One backlight may have LEDs with multiple, different emission wavelengths.

Figure 2:
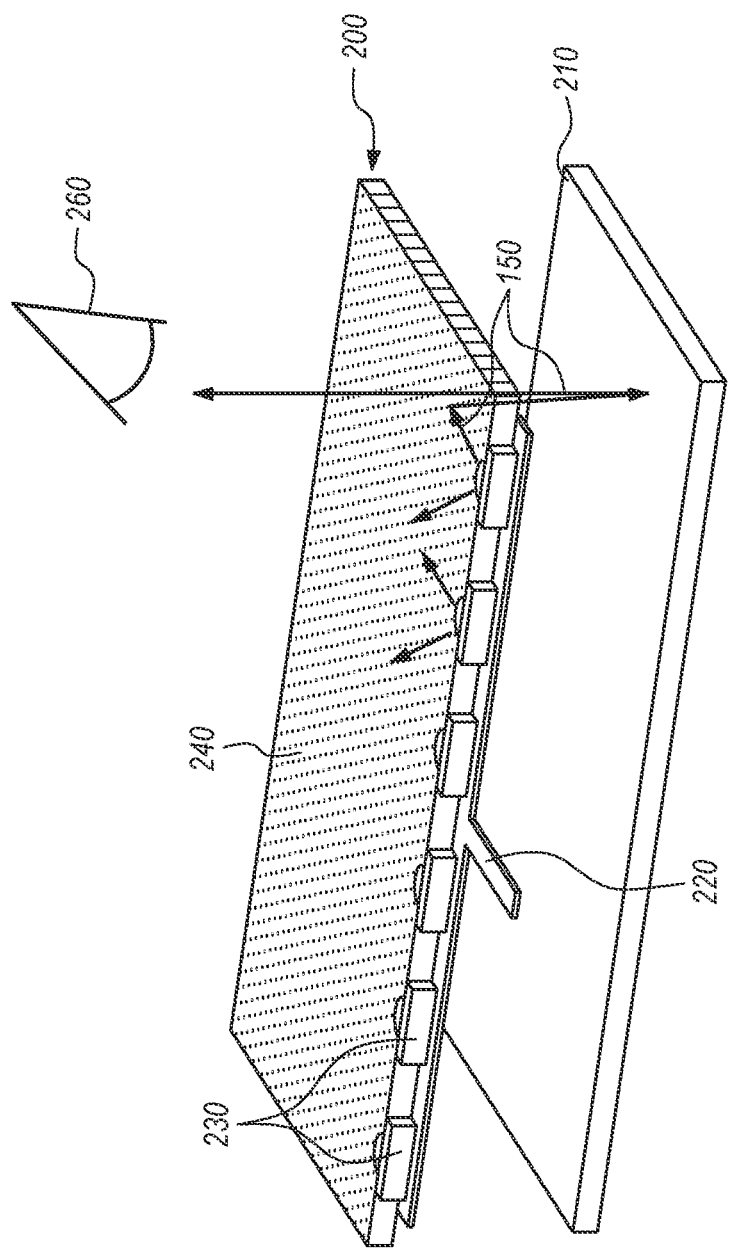
FIG. 2 shows a typical prior art front light as used in conjunction with reflective displays.

FIG. 2 shows a typical front light 200 as used in conjunction with reflective displays, such as reflective display 210. The elements of front light 200 are similar to that of backlight 100 and include flexible printed circuit board 220, illuminators 230, and lightguide 240. However, front light 200 is placed in front of the display 210 from an observer's 260 perspective, as compared to backlight 100. Additional requirements for front light 200 are that the light 150 must be exclusively directed towards the display 210 and that the front light 200 must allow for a clear, sharp, and accurate color display image.

Figure 3:
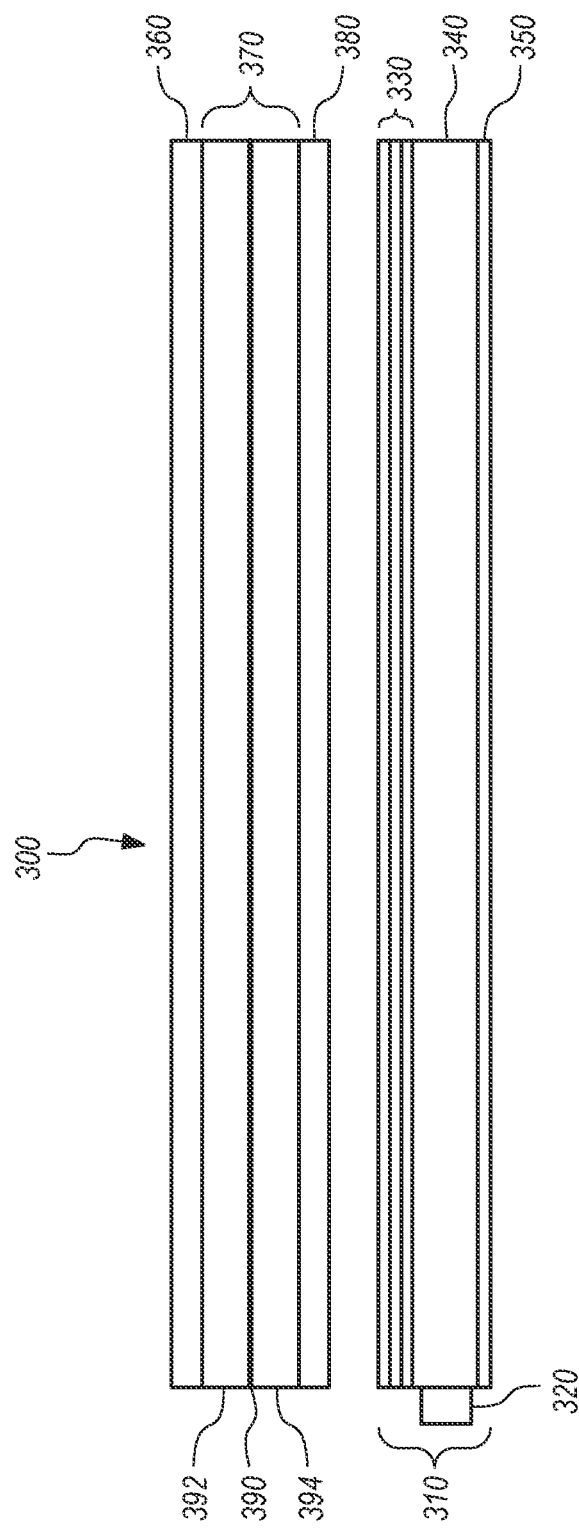
FIG. 3 shows a liquid crystal display with a backlight according to U.S. Pat. No. 9,190,004.

FIG. 3 shows a liquid crystal display 300 with backlight 310 according to U.S. Pat. No. 9,190,004. The backlight 310 is arranged behind the display 300. The backlight 310 comprises LED light source 320, a lightguide plate 340, a reflector 350 behind the lightguide plate 340, and optional light shaping films 330, located between the lightguide plate 340 and the display 300. The display 300 comprises a front polarizer 360, an LCD cell 370, and a rear polarizer 380. The LCD cell 370 also comprises a liquid crystal layer 390 interspersed between a front substrate 392 and a rear substrate 394.

U.S. Pat. No. 9,190,004 teaches that the LED light source 320 may emit visible and/or IR light and that the front polarizer 360 and rear polarizer 380 must be able to polarize both visible and infrared light in order for the display 300 to have contrast in the visible and infrared region of the electromagnetic spectrum. Typical liquid crystal display polarizers 360 and 380 work only in the visible range, where they absorb one polarization while transmitting the other polarization. Moreover, adding anisotropic IR absorbing chromophores to visible light polarizers would be required, and it is not disclosed how this can be done nor that such additional chromophores would reduce the visible light transmission and thus lead to a much dimmer display.

U.S. Pat. No. 9,191,004 teaches that certain reflective polarizers can be used such as wire grid polarizer sheets, birefringent polarizer sheets, or cholesteric liquid crystal polarizer sheets, which work both in the visible and IR region. The disadvantage of such polarizers is that they reflect, not absorb the unwanted polarization. While that can be dealt with in the rear polarizer 380, it is undesirable in front polarizer 360 as it gives the display a mirror-like appearance. Bright image areas in such a display appear bright, while dark image areas appear like a metallic mirror. An observer will see both the display image and a reflected scene superimposed onto each other.

Figure 4:
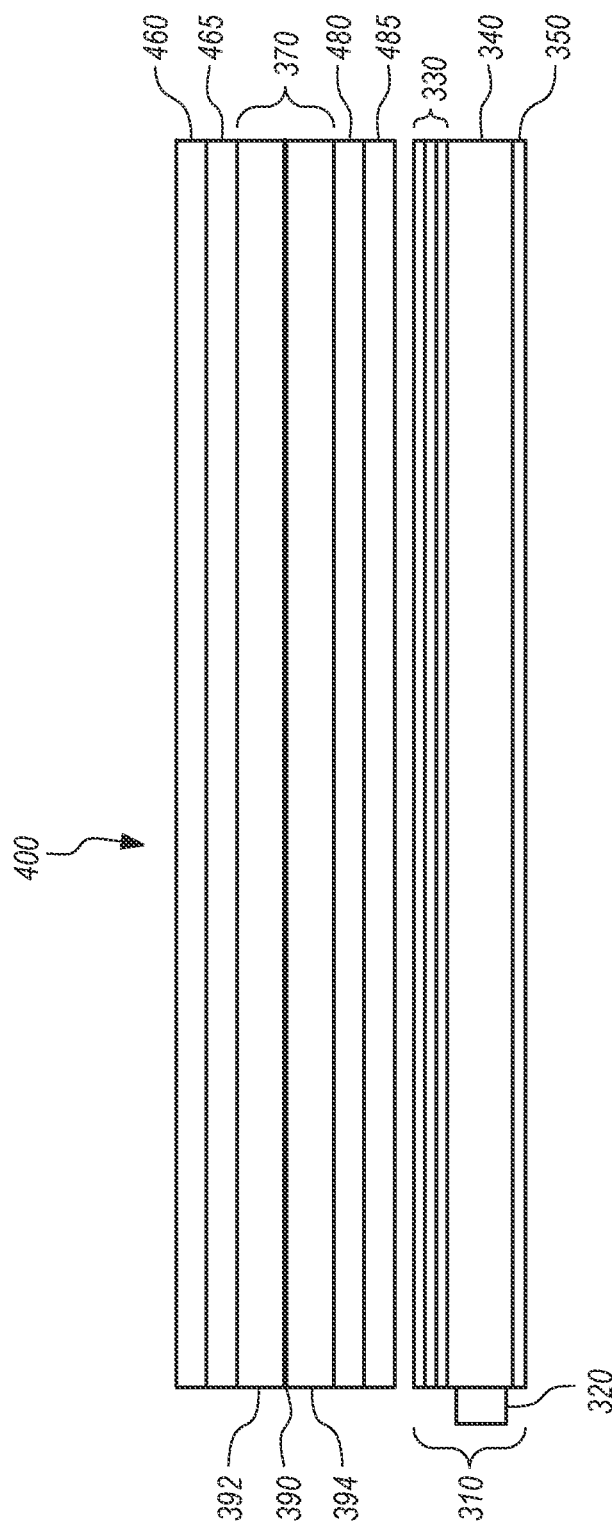
FIG. 4 shows prior art in accordance with U.S. Pat. No. 9,229,268, which is an improvement of U.S. Pat. No. 9,190,004 as it eliminates the undesirable mirror-like appearance.

FIG. 4 shows prior art in accordance with U.S. Pat. No. 9,229,268, which is an improvement of U.S. Pat. No. 9,190,004 as it eliminates the undesirable mirrorlike appearance.

The backlight 310 again comprises LED light source 320, a lightguide plate 340, a reflector 350 behind the lightguide plate 340, and optional light shaping films 330, located between the lightguide plate 340 and the display 400.

Backlight 310 is placed behind liquid crystal display 400 comprising the LCD cell 370, a sequential stack of two front polarizers comprising visible light front polarizer 460 and IR light front polarizer 465, and a sequential stack of two rear polarizers comprising visible light rear polarizer 480 and IR light rear polarizer 485. The LCD cell 370 also comprises a liquid crystal layer 390 interspersed between a front substrate 392 and a rear substrate 394.

In one embodiment, one each of the front polarizers 460 and 465, and the rear polarizers 480 and 485 is a reflective type, such as a wire grid polarizer sheet, a birefringent polarizer sheet, or a cholesteric liquid crystal polarizer sheet, which work both in the visible and IR region. The other one of the front polarizers 460 and 465 and the rear polarizers 480 and 485 is a standard liquid crystal display polarizer sheet, which work only in the visible range by absorbing one polarization, while transmitting the other polarization. This works because the standard absorbing polarizer sheets are transparent for both polarization states in the IR region.

Hence, in the infrared region the display 400 still is a mirror-like display, while in the visible region the display looks as expected with black and bright image areas. A human observer will not see the reflected infrared light, while infrared equipment used to view the display has to be arranged and designed such that the reflected unwanted polarization is not detrimental to the image quality or function of the IR system, such as by using an optical pattern or character recognition system. Using the two front polarizers 460 and 465 and the two rear polarizers 480 and 485, rather than one of each, adds two costly elements to the display 400 and since both types of polarizers are not 100% transmissive in the visible region of the electromagnetic spectrum, the brightness of the display is diminished by the second polarizer, which is unnecessary for visible light.

In addition, neither U.S. Pat. No. 9,190,004 nor U.S. Pat. No. 9,229,268 allow the use of a reflective display, which cannot be operated with a backlight. Neither patent teaches the use of a front light, but if the proposed structure were illuminated with a front light and backed with the necessary reflector, the display would be very dim as the light would travel through a sequence of eight polarizer layers, each absorbing a significant portion of the light.

Thus, this disclosure describes systems and methods of IR readable transmissive and reflective displays without a mirror appearance and without the unwanted dimming of the display due to sequential stacks of polarizers.

Figure 5A:
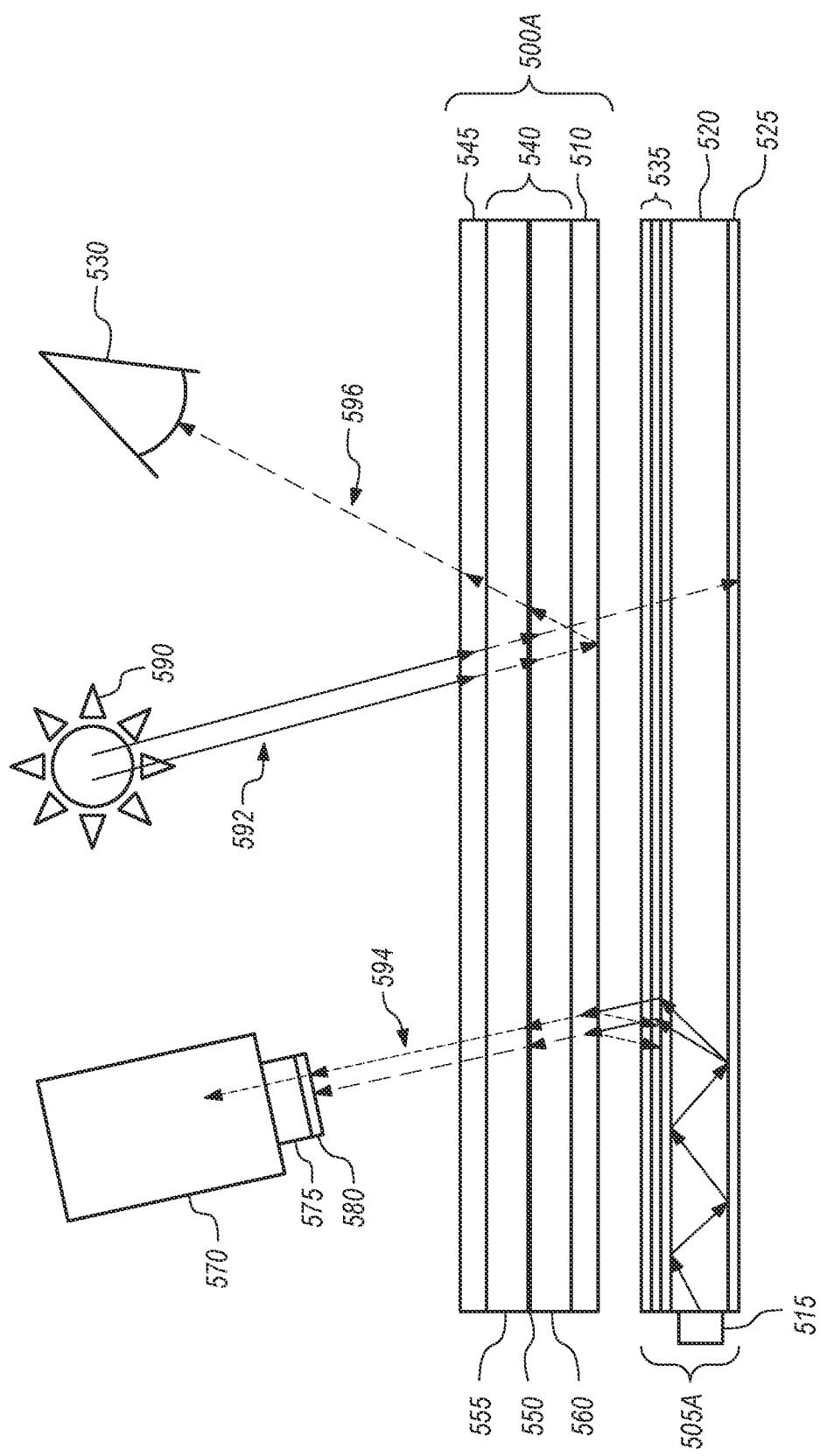
FIG. 5A shows one example embodiment of the invention consisting of an infrared transmissive LCD display with a reflective rear polarizer and a backlight backed by an absorber.

Infrared Transmissive LCD Display 500A and B with a Reflective Rear Polarizer 510 and a Non-Polarized Infrared Backlight 505A and B FIG. 5A shows one example embodiment of this invention consisting of an infrared transmissive type LCD display 500A with backlight 505A. As an infrared transmissive type display, LCD display 500A is generally transmissive to infrared light and reflective of ambient visible light.

Backlight 505A comprises light sources such as LEDs 515, emitting visible and infrared light, a lightguide 520, an absorber 525 placed behind lightguide 520 from an observer's 530 vantage point, and in one embodiment light directing and diffusing films 535 in front of the lightguide 520 and behind LCD display 500A. Optional light directing and diffusing films 535 may include optical films such as retardation films, compensation films, and other light management films that optimize the performance of the device.

LCD display 500A further comprises an LCD cell 540 between a visible light front polarizer 545 and IR capable reflective rear polarizer 510. LCD cell 540 comprises a liquid crystal layer 550 interspersed between a front substrate 555 and a rear substrate 560.

The front polarizer 545 is of an absorptive type, which absorbs visible light of the unwanted polarization, while transmitting visible light of the desired polarization as well as all infrared light irrespective of polarization. The rear polarizer 510 is a reflective type such as a wire grid polarizer sheet, a birefringent polarizer sheet or a cholesteric liquid crystal polarizer sheet, which work both in the visible and IR regions.

An infrared sensitive image capture or recording device such as camera 570 is directed towards LCD display 500A. In one embodiment, camera 570 comprises an infrared camera. Camera 570 comprises a lens 575 to focus the display image onto the sensor element (not shown) inside the camera 570. It also comprises an IR analyzer 580 to avoid glare for reflective surfaces like the polarizers used in photographic equipment to reduce glare, only with its function optimized for IR wavelengths.

Also directed towards LCD display 500A is observer 530 viewing LCD display 500A via reflection of light from visible environmental light source 590. Environmental light source 590 may be diffuse daylight, direct sunlight, room light, light from a dedicated illumination source or similar.

In FIGS. 5-11, unpolarized light 592 is shown as arrows with a solid line, a dotted line illustrates a first polarization 594, such as linear s-polarization or circular l-polarization, and a dashed line illustrates the second orthogonal to the first polarization 596, such as linear p-polarization or circular r-polarization.

In visible light observation of LCD display 500A, unpolarized light 592 from the environmental light source 590 enters LCD display 500A. The portion of the unpolarized light 592 with the undesired polarization is absorbed in front polarizer 545. Light of the desired polarization is transmitted through front polarizer 545 into LCD display 500A, where in the liquid crystal layer 550 the light either retains its polarization 596 or has its polarization morphed or changed into the orthogonal polarization 594, depending on the state of the liquid crystal layer 550.

Unchanged light is transmitted through reflective rear polarizer 510 and backlight 505A until it gets absorbed in absorber 525. The corresponding display area looks black or dark to the observer 530. Light with a changed polarization state is reflected by the rear polarizer 510 and changed back to its original polarization state in the liquid crystal layer 550, and therefore has the correct polarization state to pass the front polarizer 545 and then travels to the observer 530. The corresponding area of LCD display 500A appears bright to the observer 530. For visible observation of light from environmental light source 590, backlight 505A is not required, however, absorber 525 must be provided.

For infrared observation, the IR LEDs 515 are activated. Unpolarized IR light from IR LEDs 515 spreads through lightguide 520 and illuminates LCD display 500A uniformly from behind. After passing the light shaping and diffusing films 535, the light is polarized in reflective rear polarizer 510 as only one polarization state is transmitted, while the other polarization state is reflected. The reflected portion of the light is returned into lightguide 520 and may get absorbed in absorber 525.

The polarized light travels through liquid crystal layer 550 and depending on the alignment of the liquid crystals in liquid crystal layer 550, the light retains its polarization or changes to another polarization state. 'Bright' and 'Dark' areas of the image emit the same amount of light but with different polarization states. One of these states can pass IR analyzer 580 of camera 570 while the other polarization is rejected.

Therefore, bright and dark areas are projected by lens 575 onto the image sensor inside camera 570, corresponding to the polarization state emitting from the respective areas of the display. If desired, the contrast of the image can electronically be inverted before image analysis or before displaying the image on LCD display 500A. Because only one polarizer is used on either side of LCD display 500A there is no additional cost, thickness, and undue dimming of the brightness of LCD display 500A. Because the front polarizer 545 is an absorbing type, there is no mirror-like image display surface.

In an alternative embodiment, backlight 505A can be used in conjunction with visible light from LEDs 515. In this embodiment, the visible light image using backlight 505A has inverted contrast. Such a display arrangement may use a visible light sensor (not shown) and activate backlight 505A while simultaneously electronically reversing the contrast of the image, so that the observer sees the proper contrast (twice inverted).

It should be clear to those skilled in the art that LCD display 500A can be operated with the transmission axes of front polarizer 545 and rear polarizer 510 either orthogonal (crossed) or parallel and with the liquid crystal layer 550 being arranged to retain the polarization either when powered or not or either in one or another stable state. This leads to several possible alternative embodiments often referred to as normally white and normally black with direct or inverse contrast.

Figure 5B:
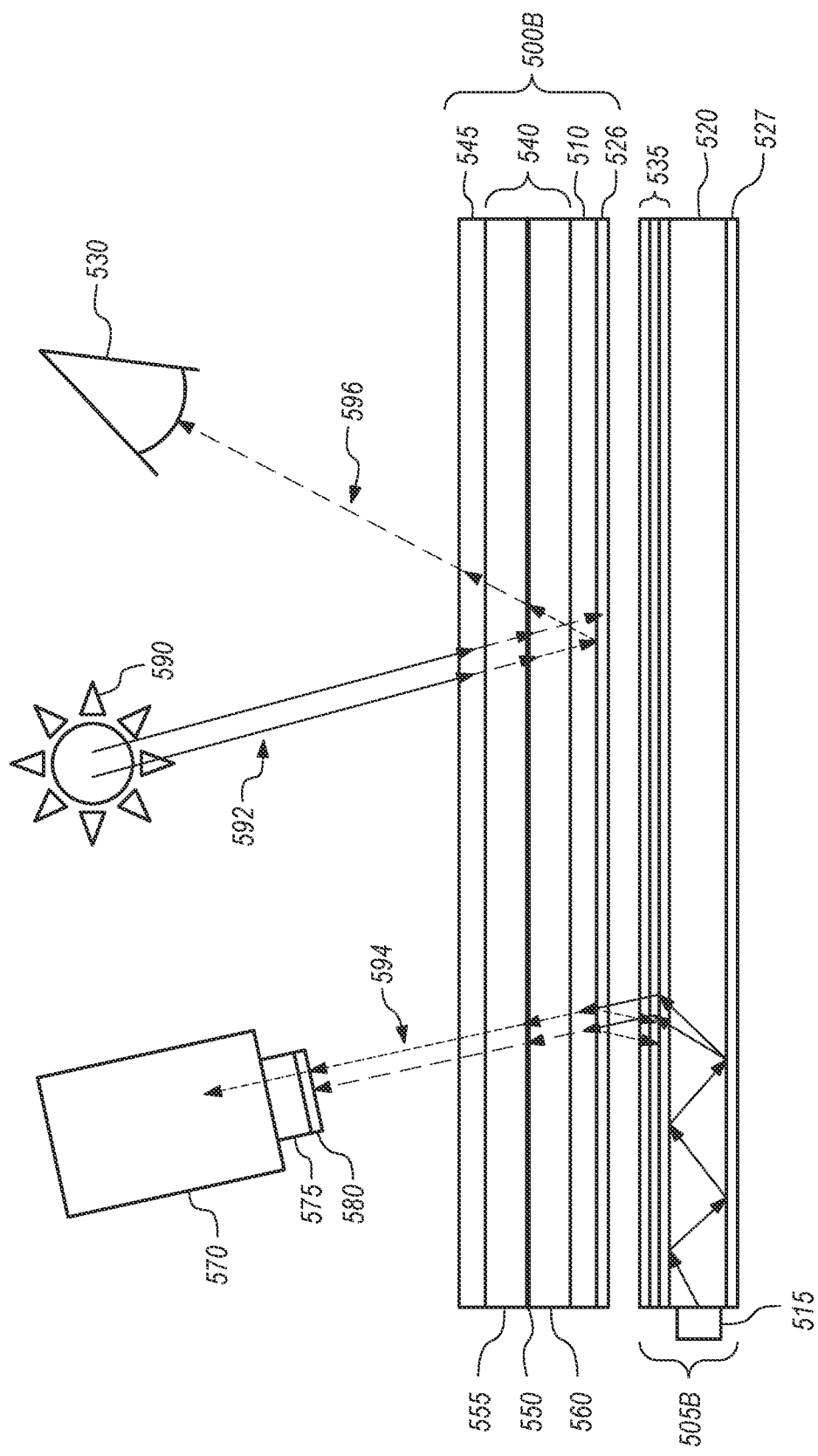
FIG. 5B shows one example embodiment of the invention consisting of an infrared transmissive LCD display with a reflective rear polarizer and a backlight backed by a mirror.

FIG. 5B shows an alternative embodiment of LCD display 500A shown in FIG. 5A. In FIG. 5B, backlight 505B has reflector 527 as the element furthest from observer 530, instead of absorber 525 in backlight 505A. In this embodiment, LCD display 500B has visibly opaque (black) layer 526 added to LCD display 500B near backlight 505B. Visibly opaque (black) layer 526 is transparent for infrared light but absorbs visible light. Visibly opaque (black) layer 526 can be printed with special dyes such as Epolight dyes, or it can be formed by a visible light absorptive polarizer with its transmission axis orthogonal to (crossed) that of the reflective rear polarizer 510. In other embodiments, visibly opaque (black) layer 526 can comprise other colors such as a blue opaque layer that transmits IR which leads to an embodiment of LCD display 500B with a blue and white contrast rather than a black and white contrast.

LCD display 500B has the advantage of reduced parallax shadow in visible light operation as absorber 525 is closer to liquid crystal layer 550. In infrared operation, the reflected polarization of the infrared light at the rear polarizer 510 is recycled in the backlight 505B. This increases the efficiency of backlight 505B.

Infrared Transmissive LCD Display 600 with Absorptive Visible Light Rear Polarizer 610 and Polarized Infrared Backlight 605

Figure 6:
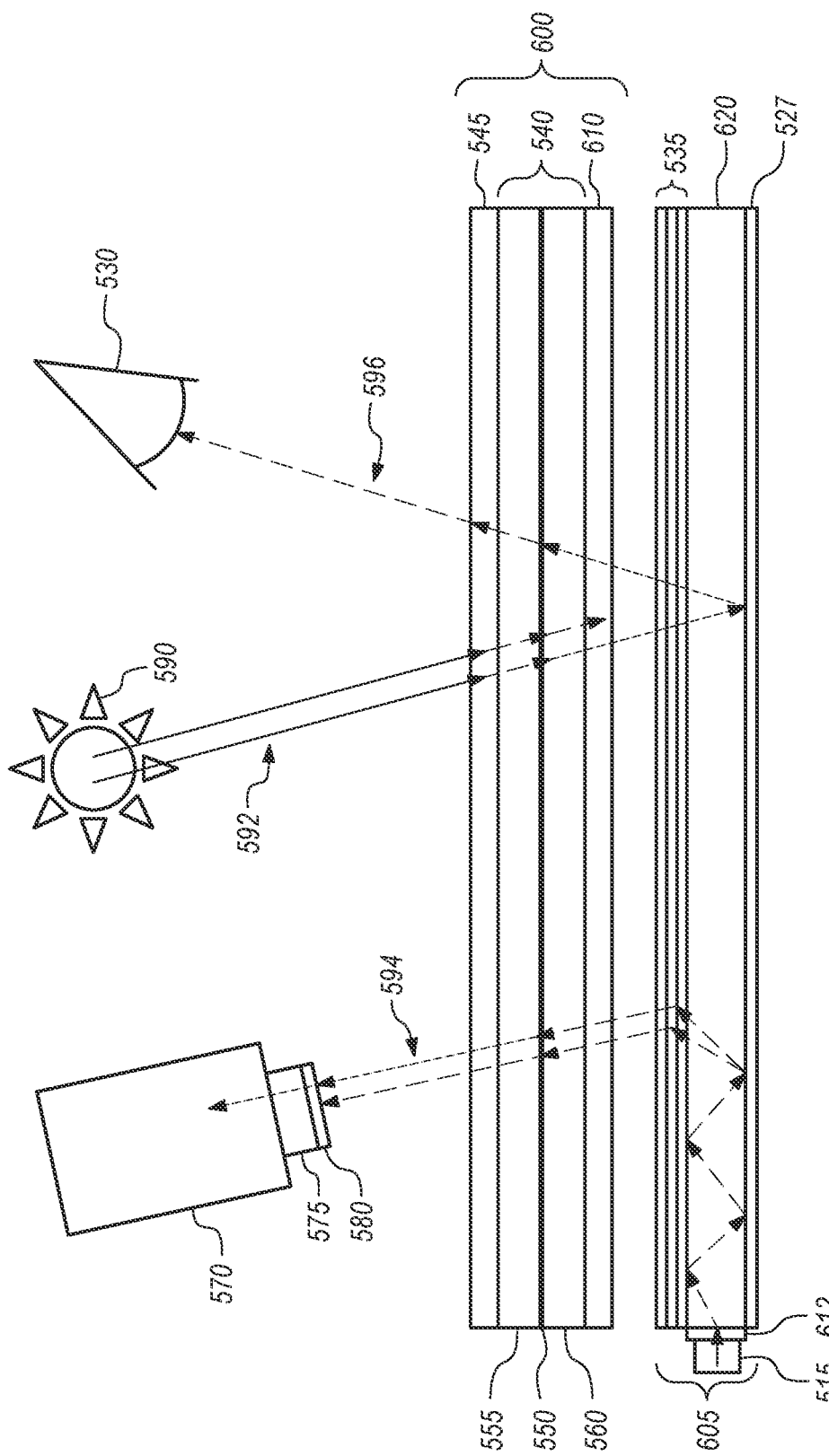
FIG. 6 shows one example embodiment of the invention consisting of an infrared transmissive LCD display with polarization conserving backlight and absorptive visible light rear polarizer.

FIG. 6 shows another embodiment of the invention. Infrared transmissive type LCD display 600 is similar to LCD display 500A except reflective rear polarizer 510 has been replaced by absorptive visible light rear polarizer 610. Backlight 605 is similar to backlight 505B except the IR polarizer 612 is added between the IR LEDs 515 and lightguide 620. In this embodiment, lightguide 620 is polarization conserving.

For visible light observation, unpolarized light 592 from environmental light source 590 enters LCD display 600. The portion of the unpolarized light 592 with the undesired polarization is absorbed in front polarizer 645. Light of the desired polarization is transmitted into LCD display 600, where, in the liquid crystal layer 550, the light either retains its polarization 596 or has its polarization morphed or changed into orthogonal polarization 594, depending on the alignment of the liquid crystals in liquid crystal layer 550. Unchanged light is absorbed in rear polarizer 610. The corresponding area of LCD display 600 looks black to observer 530.

Light with a changed polarization state is transmitted through rear polarizer 610 and backlight 605 and is reflected by reflector 527. The reflected light passes through rear polarizer 610 and is changed back to its original polarization state in the liquid crystal layer 550 and therefore has the correct polarization state to pass through front polarizer 545 and then travel to the observer 530. The corresponding area of LCD display 600 appears bright to observer 530. For visible observation with light from environment light source 590, backlight 605 is not required, but reflector 527 must be provided.

In an alternative embodiment, backlight 605 can be used with optional visible light sources (not shown) if there is insufficient environmental light. In this case, unpolarized light 592 exiting lightguide 620 is polarized by rear polarizer 610 and remains unchanged or has its polarization state changed in the liquid crystal layer 550, depending on the orientation of the liquid crystals. Light with a changed polarization state passes through front polarizer 545 and reaches the observer 530. The corresponding image area of LCD display 600 looks bright to observer 530. Light with an unchanged polarization state gets absorbed in the front polarizer 545. The corresponding image area of LCD display 600 looks dark to observer 530. This arrangement does not cause a contrast inversion.

For infrared observation, IR LEDs 515 are activated. Unpolarized IR light from IR LEDs 515 is polarized with IR polarizer 612 before entering lightguide 620. Polarized IR light spreads through lightguide 620 and illuminates LCD display 600 uniformly from behind.

After passing the optional light shaping and diffusing films 535, the light passes rear polarizer 610 unchanged as this polarizer type appears transparent to IR light. The polarized light travels through liquid crystal layer 550 where, depending on the alignment of the liquid crystals in liquid crystal layer 550, the light retains its polarization or changes to another polarization state. 'Bright' and 'Dark' areas of the image emit the same amount of light but with different polarization states. One of these states can pass IR analyzer 580 of camera 570, while the other polarization is rejected.

Therefore, bright and dark areas are projected by lens 575 onto the image sensor inside camera 570, corresponding to the polarization state emitting from the respective areas of LCD display 600. If desired, the contrast of the image can electronically be inverted before image analysis or before displaying the image on LCD display 600. Since only one polarizer is used on either side of LCD display 600 there is no additional cost, thickness, and undue dimming of the display brightness. Because front polarizer 545 is an absorbing type, there is no mirror-like image display surface for LCD display 600.

Those skilled in the art will appreciate that alternative embodiments have equivalents with parallel and crossed polarizers, and different liquid crystal director configurations, some of which may be more or less advantageous. Reflective LCD Display 700 with Reflective Rear Polarizer 510 and with Non-Polarized IR Front Light 705

Figure 7:
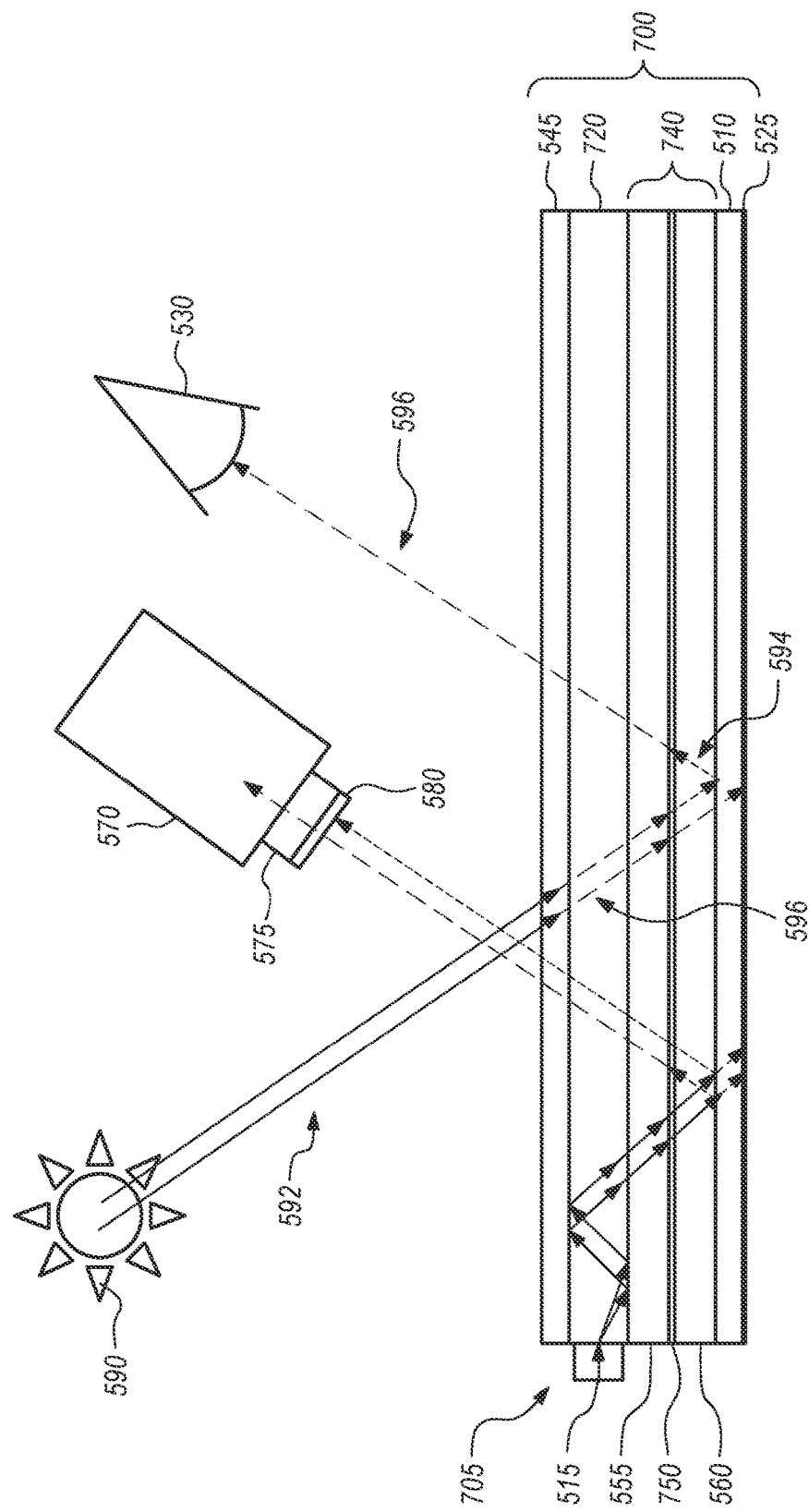
FIG. 7 shows one example embodiment of the invention consisting of a reflective LCD display with non-polarized IR front light, reflective rear polarizer, and IR analyzer on the camera.

FIG. 7 illustrates another embodiment of the invention, based on a reflective type LCD display 700. A front light 705, comprising LED illuminators 515 and a light guide 720, is placed between the front polarizer 545 and LCD cell 740. The front polarizer 545 is absorptive, which works for visible light, but appears transparent to infrared light. Rear polarizer 510 is reflective and works for both visible and infrared light. Located behind the rear polarizer 510 is an absorber 525.

For visible light observation, unpolarized light 592 from environmental light source 590 enters LCD display 700. The portion of the light with the undesired polarization is absorbed in front polarizer 545. Light of the desired polarization 596 is transmitted through front polarizer 545 and front lightguide 720 and into LCD display 700, where, in the liquid crystal layer 750, it either retains its polarization or has its polarization morphed or changed into the orthogonal polarization 594, depending on the alignment of the liquid crystals in liquid crystal layer 750.

Unchanged light 596 is transmitted through reflective rear polarizer 510 and gets absorbed in absorber 525. The corresponding area of LCD display 700 looks dark to observer 530. The observer 530 'sees' the black absorber 525. Light with a changed polarization state 594 is reflected by rear polarizer 510, changed back to its original polarization state 596 in liquid crystal layer 750, and therefore has the correct polarization state to pass through front polarizer 545 and then travel to observer 530. The corresponding area of LCD display 700 appears bright to observer 530. For visible observation with light from environment light source 590, front light 705 is not required.

In an alternative embodiment, front light 705 can be used with optional visible light sources (not shown) and a visible light polarizer (not shown) between the visible light sources and lightguide 720 if there is insufficient light from environmental light source 590. In this case, polarized light exiting the lightguide 720 takes the same path as environmental light after passing through front polarizer 745.

In another alternative embodiment, front light 705 can be positioned in front of front polarizer 745. In this case, the visible light polarizer (not shown) between visible light source (not shown) and lightguide 720 is not necessary.

For infrared observation, IR LEDs 515 are activated. Unpolarized IR light from the light source 590 spreads through lightguide 720 and illuminates LCD display 700 uniformly from the front. Because front polarizer 545 is transparent to IR light, in a modification of this embodiment, front light 705 can also be in front of front polarizer 545 from the vantage point of observer 530. The light exiting lightguide 720 towards LCD display 700 travels unchanged through liquid crystal layer 750 to rear polarizer 510, where light of one polarization is reflected into LCD display 700 while light of the other polarization is transmitted through reflective rear polarizer 510 and is absorbed in absorber 525.

The polarized light reflected into LCD display 700 travels through the liquid crystal layer 750 where, depending on the alignment of the liquid crystal in layer 750, the light retains its polarization or changes to another polarization state. The front light 705 and front polarizer 545 are transparent to IR light. 'Bright' and 'Dark' areas of the image emit the same amount of light but with different polarization states. One of these states can pass the IR analyzer 580 of camera 570 while the other polarization is rejected.

Therefore, bright and dark areas are projected by lens 575 onto the image sensor inside camera 570, corresponding to the polarization state emitting from the respective areas of the display 700. If desired, the contrast of the image can electronically be inverted before image analysis or before displaying the image on LCD display 700. Since only one polarizer is used on either side of LCD display 600 there is no additional cost, thickness, and undue dimming of the display brightness. Because the front polarizer 545 is an absorbing type, there is no mirror-like image display surface for LCD display 600.

Reflective LCD Display 800 with Reflective Rear Polarizer 510 and Polarized Infrared Front Light 805

Figure 8:
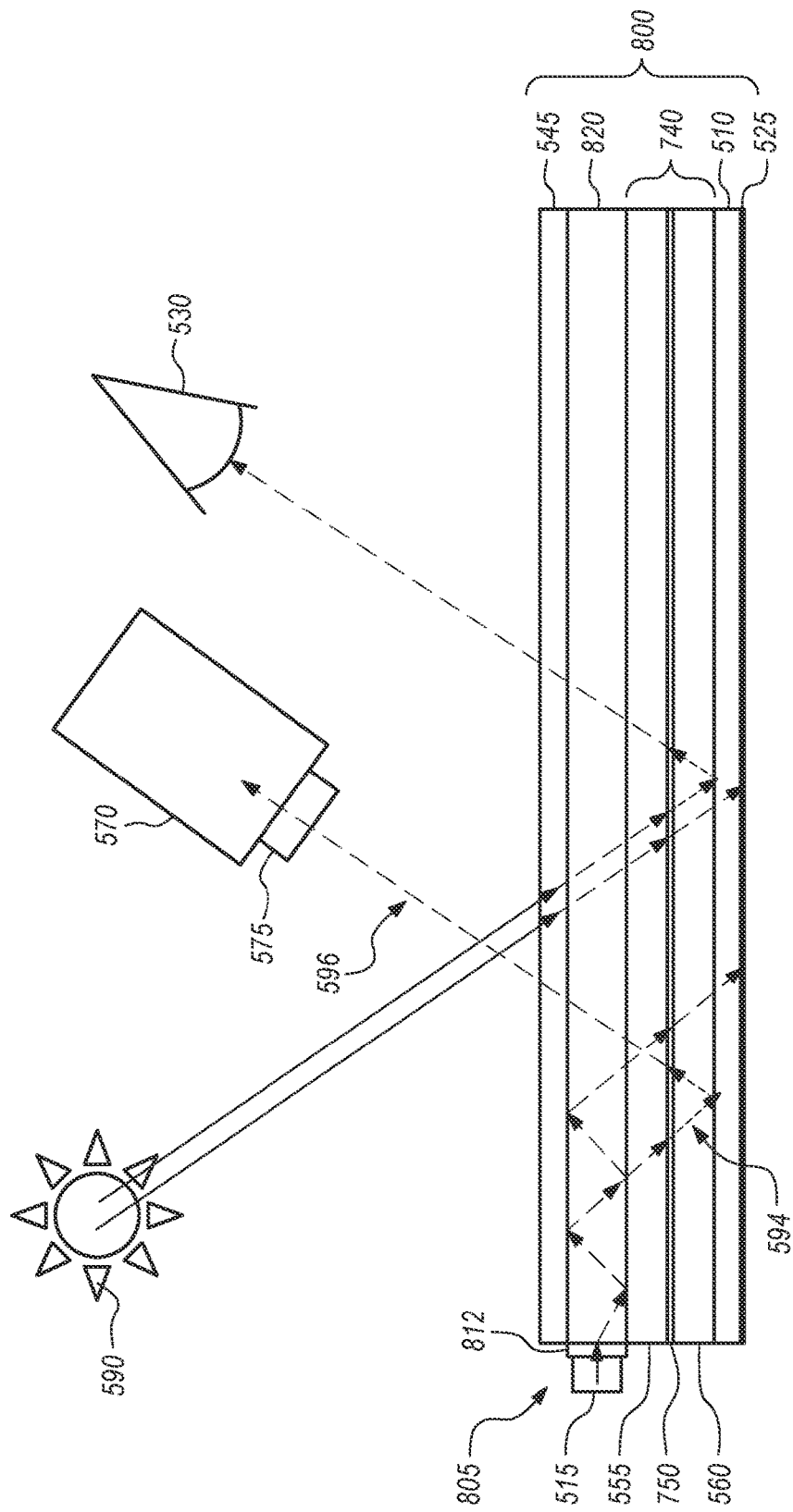
FIG. 8 shows one example embodiment of the invention consisting of a reflective LCD display with polarization conserving front light and reflective rear polarizer.

FIG. 8 illustrates another embodiment of the invention. Reflective type LCD display 800 is similar to LCD display 700 except IR polarizer 812 is placed between the IR LEDs 515 and front lightguide 820. Front lightguide 820 must be polarization maintaining.

The light path and functional principle for visible light observation for LCD display 800 is the same as for LCD display 700. For infrared observation, IR LEDs 515 are activated. Unpolarized IR light from IR LEDs 515 is polarized with IR polarizers 812 at the light source. Polarized IR light spreads through the polarization maintaining lightguide 820 and illuminates the LCD display 800 uniformly from the front. In another modification of this embodiment, because the front polarizer 545 is transparent to IR light, the front light 805 can also be in front of the front polarizer 545.

The polarized light exiting lightguide 820 into LCD display 800 travels unchanged to liquid crystal layer 750 where, depending on the orientation of the liquid crystal in liquid crystal layer 750, the light retains its polarization or changes to another polarization state. Unchanged light 596 is transmitted through reflective rear polarizer 510 and is absorbed in absorber 525. The corresponding area of LCD display 800 is imaged via lens 575 as a black area onto the sensor inside camera 570 since no light is traveling to the camera.

Light with a changed polarization state 594 is reflected by rear polarizer 510 and is changed back to its original polarization state 596 upon passing liquid crystal layer 750 a second time. Front polarizer 545 is transparent to IR light, so the light continues to camera 570. The corresponding area of LCD display 800 is imaged via lens 575 as a bright area onto the sensor inside camera 570. In this configuration, IR analyzer 580 is not required. If the camera system has an antiglare IR polarizer 580, the polarization directions of LCD display 800 must be configured such that the light 596 traveling to camera 570 is substantially vertically polarized. This ensures the light 596 can pass the antiglare IR polarizer 580, which blocks horizontally polarized light.

Figure 9:
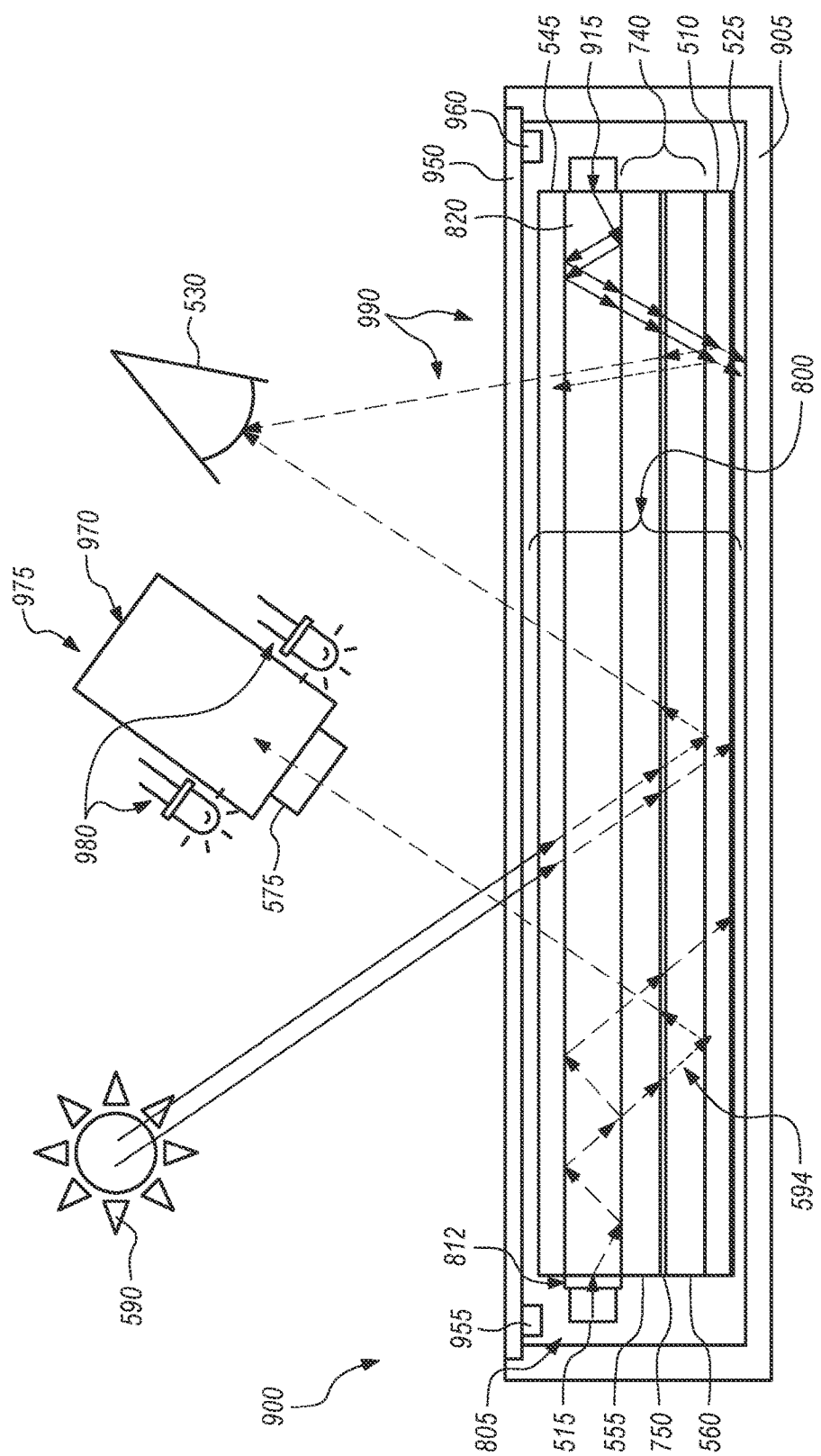
FIG. 9 shows one example embodiment of the invention consisting of a digital license plate display with reflective LCD, front light and combined IR/visible light illumination.

Digital License Plate with Reflective LCD, Front Light and Combined Infrared and Visible Light Illumination FIG. 9 illustrates display system 900, which in one embodiment is the display system of a digital license plate that requires visible readability and IR optical pattern or character recognition. In this example, for display system 900, LCD display 800 is placed into housing 905. However, in other embodiments, LCD display 500, LCD display 600, or LCD display 700 could also be used in place of LCD display 800 in display system 900. The housing 905 comprises a front lens 950, an IR light sensor 955 sensitive only to IR light, and a daylight sensor 960 sensitive only to visible light wavelengths. In addition, in one embodiment, additional optional visible light LEDs 915 may be added.

Digital license plates (not shown) must be readable by automated license plate recognition (ALPR) camera system 975. ALRP camera system 975 comprises one or more ALRP cameras 970, working with visible and IR light and infrared light illuminators 980, next to the ALRP camera 970. ALRP camera system 975 is optimized to read retroreflective license plates or license plates with diffuse, Lambertian reflectance and is necessarily placed above or to the side of the roadway or on another vehicle.

The illumination from IR illuminator 980 is coaxial with ALPR camera 970. Such light, however, is reflected by a digital license plate substantially away from ALPR camera 970, rather than back towards ALPR camera 970. This necessitates the use of internal IR illumination of the license plate.

Figure 10:
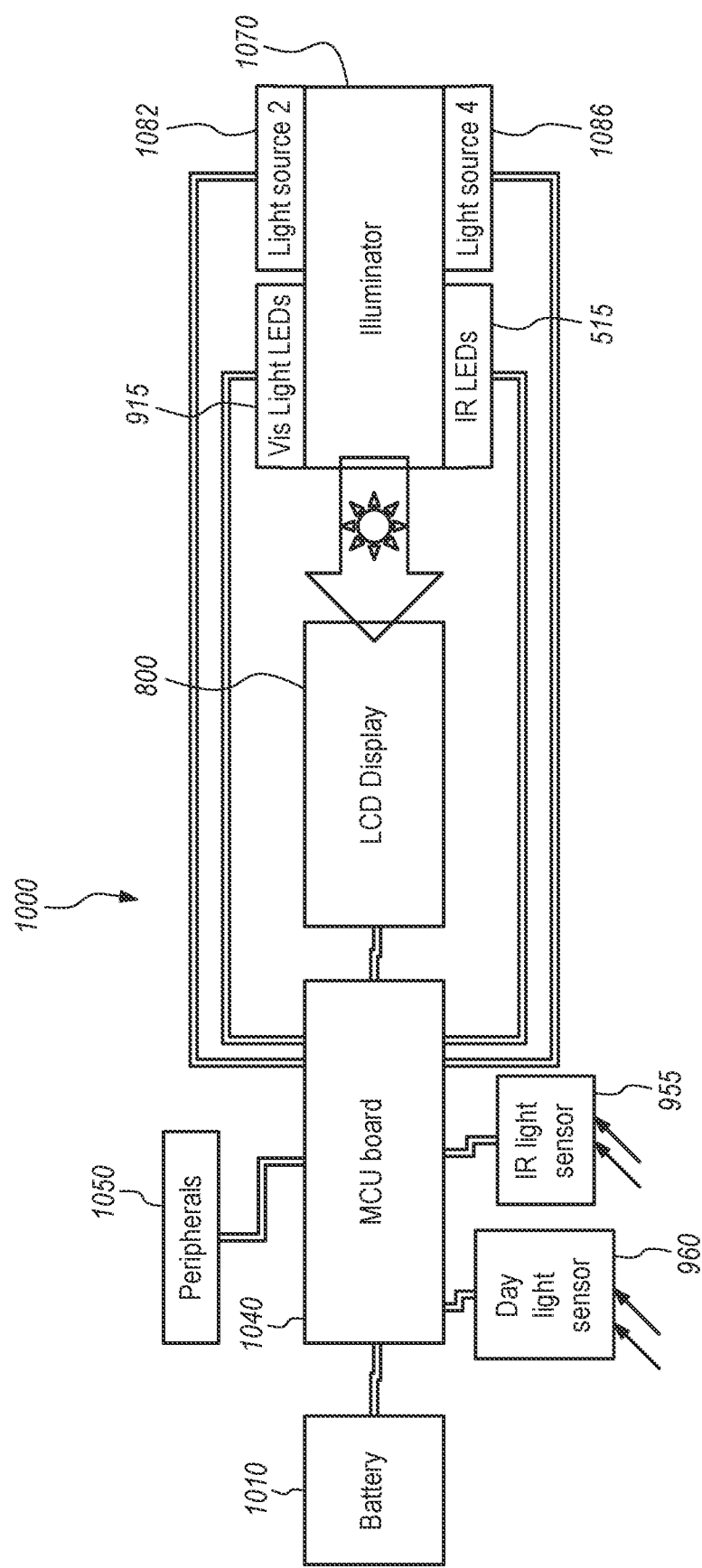
FIG. 10 shows one example embodiment of the invention consisting of a display system in the form of a block diagram.

Display system 900 has suitable electronic circuits (as shown in FIG. 10) that activate IR LEDs 515 when IR light sensor 955 senses a rapid change in IR intensity, which occurs, for example, if LCD display 800 is being flashed with ALPR camera 970 or if a vehicle drives into an IR flood illumination zone. Such electronic circuits may be based on a microcontroller unit and firmware determining when to turn on IR LEDs 515.

FIG. 10 shows display system 900 in the form of block diagram 1000 consisting of microcontroller unit (MCU) 1040 connected to battery 1010, day light sensor 960, IR sensor 955, optional peripherals 1050, LCD display 800, and illuminator unit 1070 consisting of visible light LEDs 915, second light source 1082, IR LEDs 515, and fourth light source 1086. Illuminator unit 1070 is used to illuminate display 800. In alternative embodiments, additional light sources may also be used.

Alternatively, for lower power consumption and faster response, such circuits may connect the IR light sensor 955 to an operational amplifier, which drives a current source for IR LEDs 515, causing IR LEDs 515 to flash back in sync with being flashed by IR light without the digital license plate and its microcontroller system having to wake up from a low power state.

Figure 11:
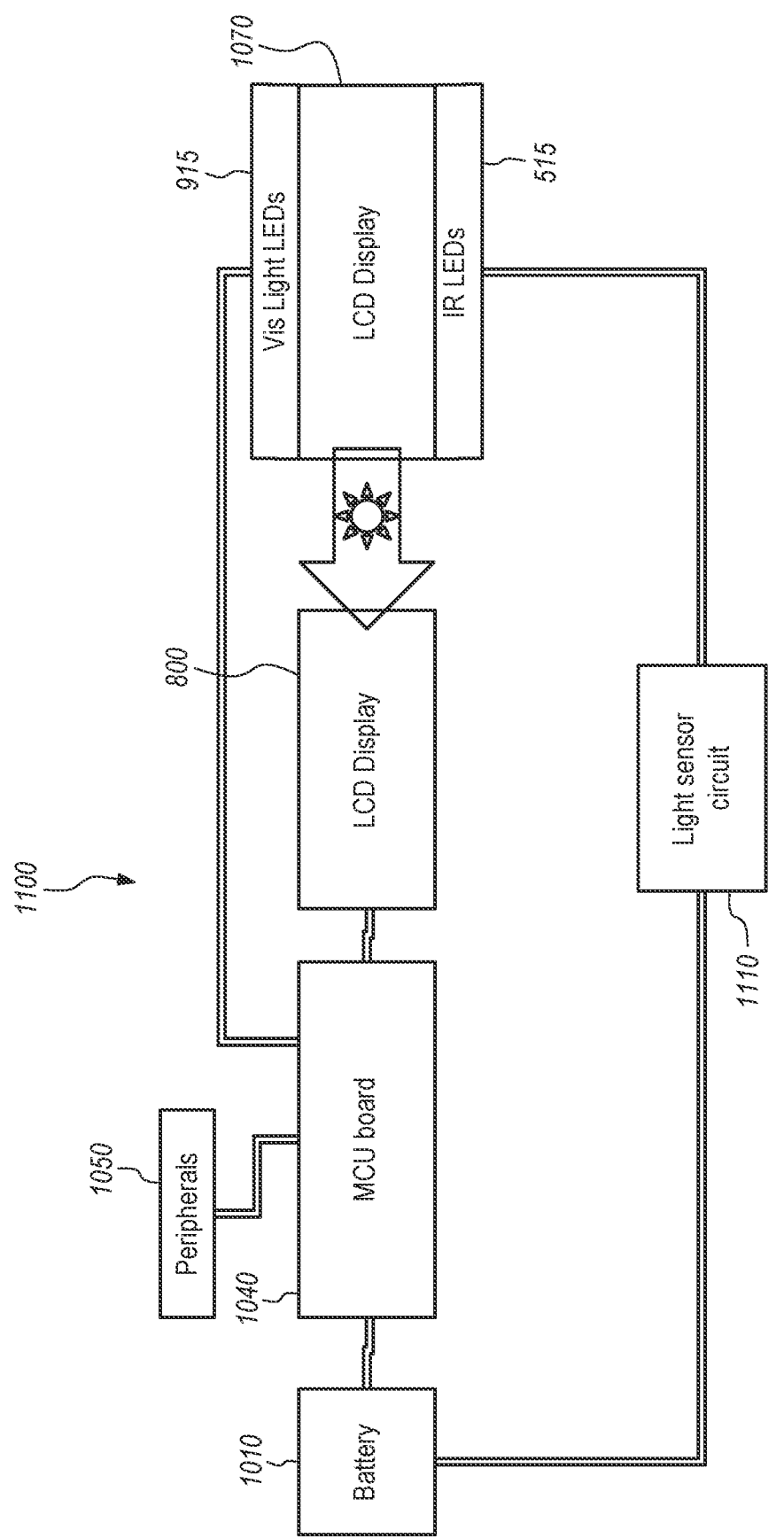
FIG. 11 shows one example embodiment of the invention consisting of an alternative layout of display system in the form of a block diagram.

FIG. 11 shows such an alternative layout of display system 900 in the form of block diagram 1100 consisting of MCU 1040 connected only to battery 1010, optional peripherals 1050, and LCD display 800. Light sensor circuit 1110 is connected directly to the battery and controls illuminator unit 1070, visible light LEDs 915, and IR LEDs 515. Illuminator unit 1070 is used to illuminate display 800.

Figure 12:
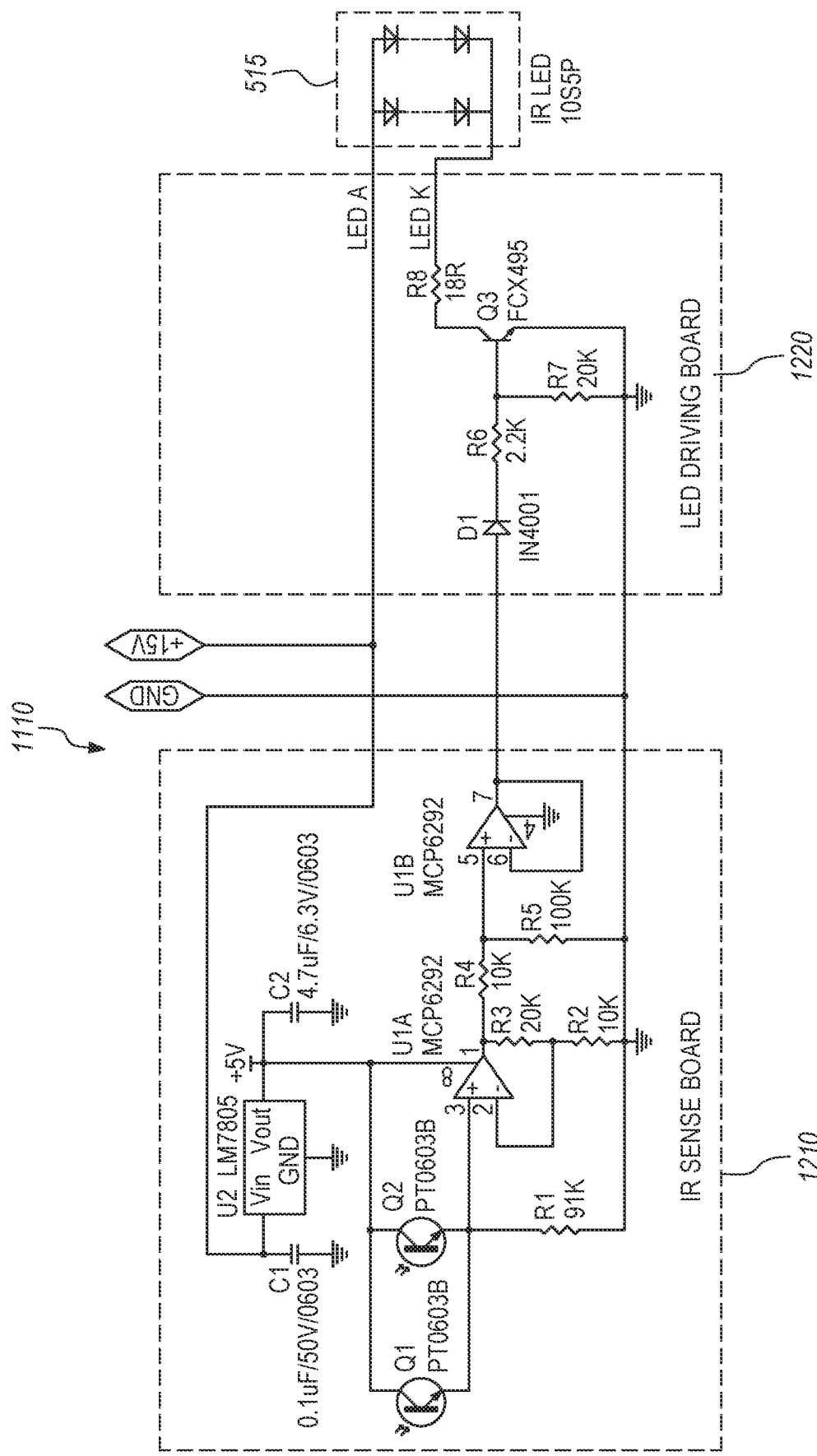
FIG. 12 shows an example circuit consisting of an IR sensing board and LED driving board that can be used to detect light and drive the IR LEDs without involvement of a microcontroller.

FIG. 12 shows an example of light sensor circuit 1110 that can be used to detect light and drive the IR LEDs 515 without involvement of MCU 1040, consisting of IR sensing board 1210 and LED driving board 1220.

Turning back to FIG. 9, the internal IR illumination of display system 900 represents an active response to interrogation, directed towards ALPR camera 970 resulting in a brighter image, lower signal-to-noise ratio and hence a better accuracy of the optical pattern or character recognition. The IR wavelength of the interrogating system and the IR wavelength of the active response are independent. The IR wavelength of internal IR LEDs 515 illuminating LCD display 800 can be chosen to achieve the best possible contrast and accuracy in the IR image capture and recording system.

The reflective LCD display 800 may be a bi-stable or multi-stable LCD due to the low power requirements of such displays compared to displays requiring constant updating. In one embodiment, the liquid crystal display maintains a stable visible image without being refreshed more than once per second. One such bistable LCD type may be a memory-in-pixel LCD, another may be a bistable nematic LCD known as Binem, or a bistable nematic display known as ZBD.

The LCD display 800 can work with a reflective rear polarizer 510, such as a multilayer polymer stack available from 3M™ known as DBEF, a wire grid polarizer such as WGF from Nagase, or similar. Such reflective polarizers have usable contrast from about 380 nm to greater than 850 nm.

Front lightguide 820 may be located on top or below front polarizer 845. It is illuminated from the edge with optional white light LEDs 915 for night visibility, controlled by daylight sensor 960, and with a plurality of IR LEDs 515 selected for a desired wavelength or multiple desired wavelengths depending on the requirements of the location where such a license plate is issued. Automated license plate recognition systems operate at specific infrared wavelengths, such as 740 nm, 850 nm, 940 nm and others. For example, IR LED's may comprise several 740 nm and several 850 nm LEDs if that matches the requirement. One of skill in the art would understand that other combinations are possible as well.

Polarizer 812 may be a dye type polarizer with dye selected for infrared operation and it is not required to have good transmission or polarization efficiency in the visible spectrum as no visible light is required to pass through it. Another suitable type of polarizer may be a wire grid type polarizer or multi-layer stack polarizer as such polarizers are simpler and easier to produce at a lower cost than wire grip polarizers for the visible range.

Polarization preserving lightguide 820 may be made from transparent polymers, glass, or a combination of different transparent materials and may be coated with materials of a different refractive index.

Also shown in FIG. 9 is the light path 990 for observer 530 in night mode. If the daylight sensor 960 detects a dark environment, it may activate the visible light LEDs 915. Unpolarized light from visible light LEDs 915 travels through the lightguide 820 from where it is directed uniformly towards LCD display 800. Because the light is unpolarized it passes through the display unchanged.

Part of the light is reflected at rear polarizer 510, while light of the undesirable polarization passes through rear polarizer 510 and is absorbed by absorber 525. The reflected polarized light will either remain unchanged or its polarization will be changed by the liquid crystal layer 850, depending on the orientation of the liquid crystals in liquid crystal layer 750.

Light with an unchanged polarization state will be absorbed by front polarizer 545. The corresponding image areas of LCD display 800 appear dark to observer 530. Light with a change in polarization state passes front polarizer 545 and reaches observer 530. Corresponding display areas of LCD display 800 appear bright. In an alternative embodiment, front light 805 can also be placed in front of front polarizer 845. In this case visible light exiting lightguide 820 will first be polarized by the absorptive front polarizer 845 before passing to the display in an analogous fashion. In yet another alternative embodiment, a visible light polarizer can be placed between visible light LEDs 915 and lightguide 820.

While the invention has been specifically described in connection with certain specific embodiments thereof, it is to be understood that this is by way of illustration and not of limitation. Reasonable variations and modifications are possible within the scope of the foregoing disclosure and drawings without departing from the spirit of the invention.

What is claimed is:

1. An infrared transmissive and visible light reflective liquid crystal display system comprising:
    a liquid crystal display comprising:
        a liquid crystal display cell comprising:
            a liquid crystal layer to control a polarization state of visible light and a polarization state of infrared light;
            a front substrate;
            a rear substrate; and
            wherein the liquid crystal layer is located between the front substrate and the rear substrate;
        a transmissive visible light front polarizer, wherein the visible light front polarizer is transparent to infrared light; and
        a transmissive visible light rear polarizer, wherein the visible light rear polarizer is transparent to infrared light;
    a polarized infrared light backlight illumination unit comprising a plurality of light sources, wherein at least one of the plurality of light sources emits infrared light;
    a polarization conserving light guide;
    a plurality of infrared polarizers between the plurality of light sources and the polarization conserving light guide;
    and
    a reflective layer behind the polarization conserving light guide to reflect visible and infrared light, wherein a display content is configured to be observed simultaneously by a viewer using reflected visible light and a polarized infrared camera system using light generated by the polarized infrared light backlight illumination unit.

2. An infrared light readable reflective liquid crystal display system for an electronic license plate comprising:
    a liquid crystal display comprising:
        a liquid crystal display cell comprising:
            a liquid crystal layer to control a polarization state of visible light and a polarization state of infrared light;
            a front substrate;
            a rear substrate; and
            wherein the liquid crystal layer is located between the front substrate and the rear substrate;
        a visible light front polarizer, wherein the visible light front polarizer is transparent to infrared light; and
        a reflective rear polarizer to polarize visible light and infrared light;
    an illumination unit comprising a plurality of light sources wherein at least one of the plurality of light sources emits infrared light;
    a plurality of light sensors wherein at least one of the plurality of light sensors is sensitive to infrared light; and
    a driver capable of driving the at least one of the plurality of light sources that emits infrared light in response to the sensors detecting externally created infrared light impinging onto the liquid crystal display, wherein the liquid crystal display is configured to can be simultaneously observed with visible light and read by an infrared vision system.

3. The infrared light readable liquid crystal display system for an electronic license plate of claim 2 further comprising a microcontroller to receive an input from the at least one of the plurality of light sensors sensitive to infrared light, and wherein based on the input the microcontroller controls the at least one of the plurality of light sources that emits infrared light.

4. The infrared light readable reflective liquid crystal display system for an electronic license plate of claim 2 further comprising a separate circuit to detect externally created infrared light impinging on the display and using the plurality of light sources that emits infrared light in the front light unit to actively respond to the incoming infrared light as to amplify the light reflected to the infrared vision system.

5. The infrared light readable reflective liquid crystal display system for an electronic license plate of claim 2 wherein the plurality of light sources comprises:
- an infrared emitting light source; and
- a visible light emitting light source.

6. The infrared light readable reflective liquid crystal display system for an electronic license plate of claim 2 wherein the liquid crystal display maintains a stable visible image without being refreshed more than once per second.

* * * * *